(12) United States Patent
Ju (10) Patent No.: US 10,713,985 B2
(45) Date of Patent: Jul. 14, 2020

(54) INSPECTING METHOD OF LIGHT EMITTING DIODE AND APPARATUS FOR INSPECTING THE SAME

(71) Applicant: SAMSUNG DISPLAY CO., LTD., Yongin-si, Gyeonggi-Do (KR)

(72) Inventor: Sungbae Ju, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 16/044,904

(22) Filed: Jul. 25, 2018

(65) Prior Publication Data
US 2019/0180661 A1    Jun. 13, 2019

(30) Foreign Application Priority Data
Dec. 11, 2017    (KR) .................. 10-2017-0169363

(51) Int. Cl.
| | | |
|---|---|---|
| *G01N 21/00* | (2006.01) | |
| *G09G 3/00* | (2006.01) | |
| *G01N 21/956* | (2006.01) | |
| *G01N 21/88* | (2006.01) | |
| *G01J 1/42* | (2006.01) | |

(52) U.S. Cl.
CPC ............ *G09G 3/006* (2013.01); *G01J 1/42* (2013.01); *G01N 21/8806* (2013.01); *G01N 21/956* (2013.01); *G01J 2001/4252* (2013.01)

(58) Field of Classification Search
CPC ............ G01R 31/2635; G01R 1/0416; G01R 1/07342; G02B 27/017; G01J 1/42; G01J 1/0437; G01N 21/8806; G01N 21/274; G01N 21/956

USPC ............................ 356/237.1–237.5, 121–123
See application file for complete search history.

(56) References Cited

U.S. PATENT DOCUMENTS

| | | | |
|---|---|---|---|
| 5,504,438 A | * | 4/1996 | Henley ................. G09G 3/006 324/760.02 |
| 8,415,174 B2 | | 4/2013 | Tanaka |
| 8,922,643 B2 | | 12/2014 | Ji et al. |
| 2008/0145517 A1 | | 6/2008 | Sasazawa et al. |
| 2008/0204029 A1 | * | 8/2008 | Mihai ................. H05B 33/089 324/414 |
| 2011/0074429 A1 | * | 3/2011 | Levey .................... G09G 3/006 324/414 |
| 2013/0048945 A1 | | 2/2013 | Fang et al. |

(Continued)

FOREIGN PATENT DOCUMENTS

| | | |
|---|---|---|
| KR | 10-2008-0057130 | 6/2008 |
| KR | 10-2012-0051633 | 5/2012 |
| KR | 10-2012-0109915 | 10/2012 |

*Primary Examiner* — Hoa Q Pham
(74) *Attorney, Agent, or Firm* — F. Chau & Associates, LLC (57) ABSTRACT

A method of inspecting light emitting elements includes disposing a first electrode and a second electrode on a substrate. A solution including a plurality of light emitting elements is applied on the first electrode and the second electrode. A first voltage is applied across the first electrode and the second electrode so as to cause the plurality of light emitting elements to emit light. The light emitted from the plurality of light emitting elements is photographed and first image data is generated therefrom. A density of the plurality of light emitting elements is determined using the first image data.

21 Claims, 8 Drawing Sheets

(56) References Cited

U.S. PATENT DOCUMENTS

| | | | |
|---|---|---|---|
| 2016/0148911 A1* | 5/2016 | Do | H01L 25/0753 |
| | | | 257/88 |
| 2017/0200859 A1* | 7/2017 | Do | H01L 33/36 |
| 2019/0018057 A1* | 1/2019 | Pappas | G01R 31/2635 |
| 2019/0088724 A1* | 3/2019 | Do | H01L 33/504 |
| 2019/0244985 A1* | 8/2019 | Kim | H01L 27/124 |

* cited by examiner

INSPECTING METHOD OF LIGHT EMITTING DIODE AND APPARATUS FOR INSPECTING THE SAME

CROSS-REFERENCE TO RELATED APPLICATION

This application claims priority under 35 U.S.C. § 119 to Korean Patent Application No. 10-2017-0169363, filed on Dec. 11, 2017, in the Korean Intellectual Property Office (KIPO), the disclosure of which is incorporated by reference herein in its entirety.

TECHNICAL FIELD

Exemplary embodiments of the present invention relate to light emitting diodes (LEDs) and, more specifically, to a method of inspecting light emitting diodes and to an apparatus for inspecting light emitting diodes.

DISCUSSION OF RELATED ART

Display devices are widely used in all manner of devices. Examples of popular types of display devices include liquid crystal display ("LCD") devices, organic light emitting diode ("OLED") display devices, plasma display panel ("PDP") devices, electrophoretic display devices, and the like.

Further, in recent years, display devices have been designed and manufactured to include nanosized light emitting elements (e.g., light emitting diodes). These nanosized light emitting elements may be formed as a semiconductor element which has a structure in which an n-type semiconductor crystal and a p-type semiconductor crystal are bonded to each other. This semiconductor junction may then act to convert an electric signal into light having a wavelength band of a desired range.

However, owing to the small size of the nanosized light emitting elements, it is difficult to individually dispose the light emitting elements on electrodes and electrically connect them to the electrodes. In addition, when the nanosized light emitting elements are self-aligned in a solution state, various defects may tend to occur, e.g., the light emitting elements may be too densely disposed at certain positions or may be shorted to each other.

SUMMARY

A method of inspecting light emitting elements includes disposing a first electrode and a second electrode on a substrate. A solution including a plurality of light emitting elements is applied on the first electrode and the second electrode. A first voltage is applied across the first electrode and the second electrode so as to cause the plurality of light emitting elements to emit light. The light emitted from the plurality of light emitting elements is photographed and first image data is generated therefrom. A density of the plurality of light emitting elements is determined using the first image data.

An apparatus for inspecting light emitting elements includes a stage configured to support a substrate disposed thereon. The substrate includes a first electrode and a second electrode and has a solution including light emitting elements applied thereon. A power supply applies a first voltage across the first and second electrodes. A camera is disposed on the stage. The camera is configured to photograph light emitted from the light emitting elements and to output first image data generated therefrom. A display unit displays the first image data output from the camera.

A method for inspecting light emitting elements includes applying a liquid solution in which a plurality of light emitting elements is suspended on a substrate having a pair of electrodes. A first voltage is applied across the pair of electrodes. A first photograph of the substrate is acquired while the first voltage is being applied. It is determined whether a distribution of the plurality of light emitting elements on the substrate is even using the acquired first photograph. The liquid solution is reapplied to the substrate when it is determined that the distribution of the plurality of light emitting elements on the substrate is not even.

BRIEF DESCRIPTION OF THE DRAWINGS

A more complete appreciation of the present invention will become more apparent by describing in detail exemplary embodiments thereof with reference to the accompanying drawings, wherein.

DETAILED DESCRIPTION

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

In the drawings, thicknesses of a plurality of layers and areas may be illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Further when a layer, area, or plate is referred to as being "below" another layer, area, or plate, it may be directly below the other layer, area, or plate, or intervening layers, areas, or plates may be present therebetween.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, 5% of the stated value.

Hereinafter, a display device including light emitting elements (herein, referred to as light emitting diodes ("LEDs")) will be described with reference to FIGS. 1, 2, and 3.

Figure 1:
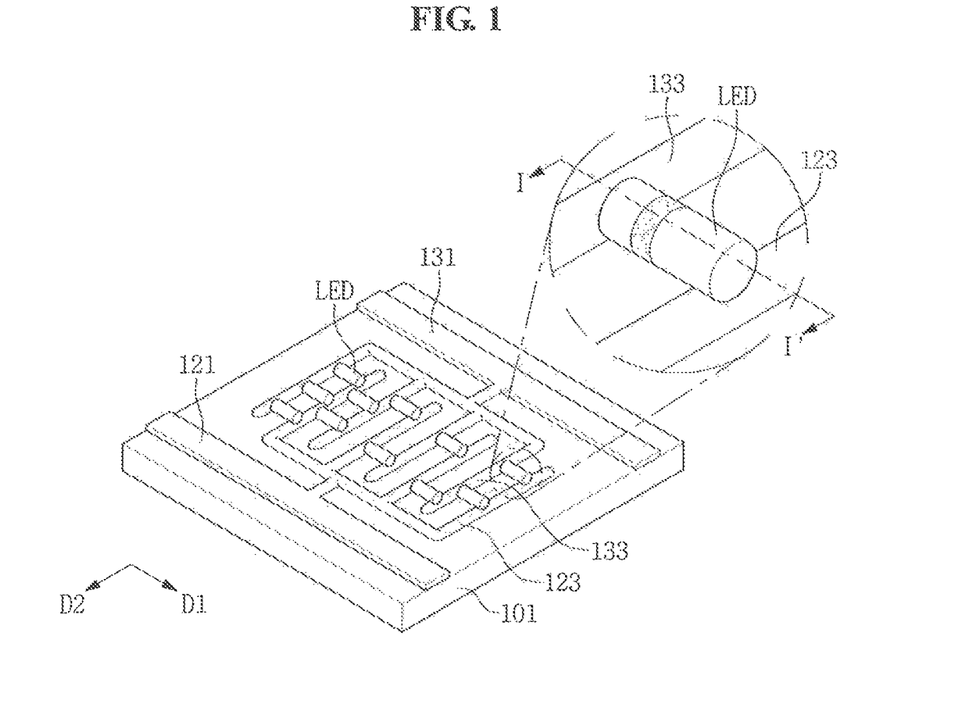
FIG. 1 is a perspective view illustrating one pixel of a display device including a light emitting element in accordance with exemplary embodiments of the present invention.
Figure 2:
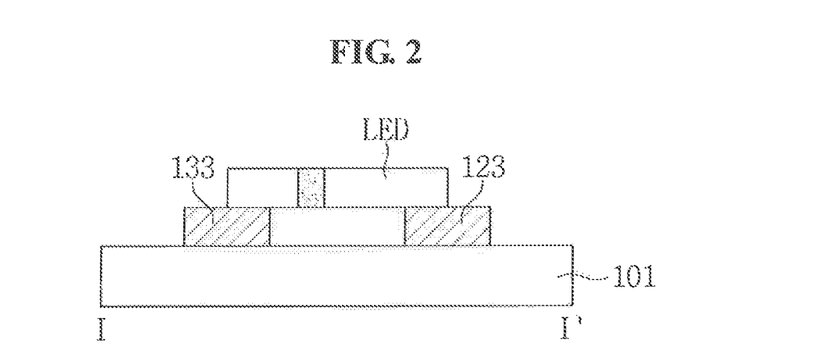
FIG. 2 is a cross-sectional view taken along line I-I' of FIG. 1.
Figure 3:
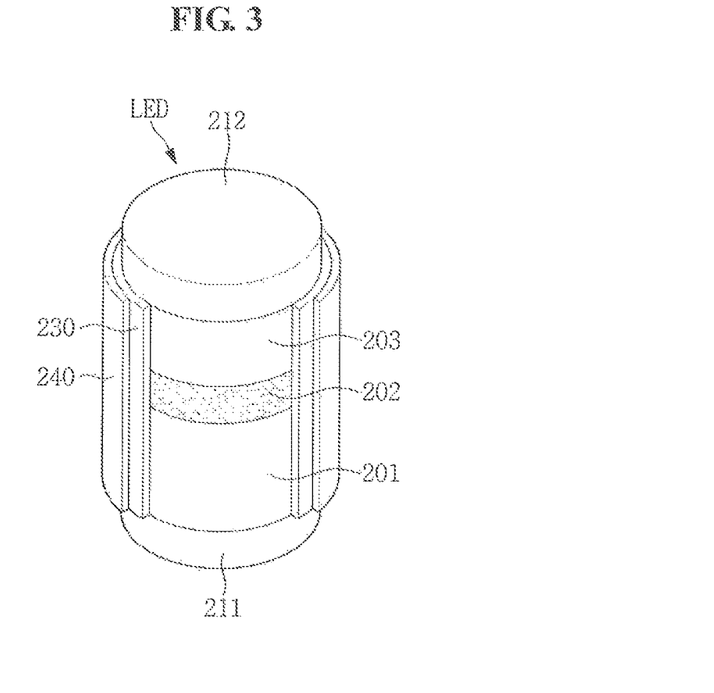
FIG. 3 is a perspective view illustrating one LED in accordance with exemplary embodiments of the present invention.

FIG. 1 is a perspective view illustrating one pixel of a display device including LEDs, FIG. 2 is a cross-sectional view taken along line I-I' of FIG. 1, and FIG. 3 is a perspective view illustrating one LED. Here, the pixel means a space in which a plurality of LEDs can be substantially located. The pixel may mean a space defined by first and second wirings and may mean a space in which first and second electrodes are disposed.

As illustrated in FIGS. 1 and 2, the display device includes a substrate 101, first and second wirings 121 and 131 on the substrate 101, first and second electrodes 123 and 133 respectively connected to the first and second wirings 121 and 131, and a plurality of LEDs.

The substrate 101 may be an insulating substrate and may include, for example, glass, quartz, ceramic, plastic, and/or the like. However, exemplary embodiments are not limited thereto, and the substrate 101 may include a metallic material such as stainless steel.

The first and second wirings 121 and 131 which each extend along a first direction D1 are disposed on the substrate 101 and are spaced apart from each other. Although it is depicted that the first and second wirings 121 and 131 are directly disposed on a surface of the substrate 101, exemplary embodiments are not limited thereto. Alternatively, the first and second wirings 121 and 131 may be space apart from the surface of the substrate 101. For example, at least one thin film transistor may be disposed between the substrate 101 and the first and second wirings 121 and 131, and the thin film transistor may be electrically connected to at least one of the first and second wirings 121 and 131.

In addition, although it is depicted that the first and second wirings 121 and 131 are disposed on a substantially same plane, exemplary embodiments are not limited thereto. Alternatively, the first and second wirings 121 and 131 may be disposed on different planes.

The first and second electrodes 123 and 133 are disposed between the first and second wirings 121 and 131. Each of the first and second electrodes 123 and 133 extends along a second direction D2 which intersects the first direction D1 (for example, at a right angle), and the first and second electrodes 123 and 133 are alternately disposed with respect to each other along the first direction D1.

The first electrode 123 may be formed unitarily with the first wiring 121. The second electrode 133 may be formed unitarily with the second wiring 131. For example, the first electrode 123 may extend from the first wiring 121 toward the second wiring 131. The second electrode 133 may extend from the second wiring 131 toward the first wiring 121. However, it is noted that other configurations may be used. For example, the first electrode 123 may be disposed on a different plane than the first wiring 121, and the first electrode 123 may be electrically connected to the first wiring 121 through a separate connection electrode. Similarly, the second electrode 133 may be disposed on a different plane than the second wiring 131, and the second electrode 133 may be electrically connected to the second wiring 131 through a separate connection electrode.

The first and second wirings 121 and 131 and the first and second electrodes 123 and 133 each include a conductive material. For example, each of the first and second wirings 121 and 131 and the first and second electrodes 123 and 133 may include or be formed of: conductive oxide, such as indium tin oxide (ITO), indium zinc oxide (IZO), zinc oxide (ZnO) and indium tin zinc oxide (ITZO), or a metal material including Ag, Mg, Al, Pt, Pd, Au, Ni, Nd, Ir, Cr, and/or Cu. In addition, each of the first and second wirings 121 and 131 and the first and second electrodes 123 and 133 may have a multilayer structure in which a plurality of differently-composed layers are stacked.

Each of the plurality of LEDs are disposed on the substrate 101 on which the first and second electrodes 123 and 133 are disposed. Each LED is a semiconductor element which receives an electric signal and, in response, emits light of a specific wavelength range. Although it is depicted that each of the plurality of LEDs is disposed to overlap the first and second electrodes 123 and 133, exemplary embodiments are not limited thereto. Alternatively, the plurality of LEDs may be disposed in various structures in which they may be electrically connected to the first and second electrodes 123 and 133. For example, the plurality of LEDs may be disposed between the first and second electrodes 123 and 133 are spaced apart from the first and second electrodes 123 and 133, and each of the plurality of LEDs may be connected to the first and second electrodes 123 and 133 through a separate connection electrode. For example, although a distance between the first and second electrodes 123 and 133 that are adjacent to each other is depicted as being less than a length of each of the LEDs, exemplary embodiments are not limited thereto. Alternatively, the distance between the first and second electrodes 123 and 133 that are adjacent to each other may be substantially equal to or larger than the length of each of the LEDs.

A diameter of the LED may be in a range from about 100 nm to about 1 μm. For example, the diameter of the LED may be about 500 nm. When the diameter of the LED is less than about 100 nm, it may be difficult to manufacture a highly efficient LED, and when the diameter of the LED exceeds about 1 μm, luminous efficiency of the display device including the LEDs may be reduced. In addition, the length of the LED may be in a range from about 500 nm to about 10 μm, and an aspect ratio (a ratio between the diameter and length) of the LED may be in a range from about 1:1.2 to about 1:10. The LED has nanosized diameter and length, and such an LED may be referred to as a significantly small-sized LED, a micro LED, or a nano LED.

As illustrated in FIG. 3, the LED includes a first semiconductor layer 201, an active layer 202 disposed on the first semiconductor layer 201, and a second semiconductor layer 203 disposed on the active layer 202. The LED has a rod shape, e.g., a cylindrical shape. However, exemplary embodiments are not limited thereto, and the LED may have a polyprism shape such as a triangular prism, a quadrangular prism, a hexagonal prism, or the like.

The first semiconductor layer 201 may be an n-type semiconductor layer. For example, the first semiconductor layer 201 may be formed by doping a semiconductor material such as InAlGaN, GaN, AlGaN, InGaN, AlN, or InN with a dopant such as Si, Ge, or Sn. However, exemplary embodiments are not limited thereto, and the semiconductor material and the dopant of the first semiconductor layer 201 may be determined according to a desired emission color of the LED. In addition, a thickness of the first semiconductor layer 201, in the lengthwise direction of the cylinder, may be in a range from about 500 nm to about 5 µm, but exemplary embodiments are not limited thereto.

The active layer 202 is disposed on the first semiconductor layer 201. The active layer 202 may be formed into a single or multiple quantum well structure. When a voltage is applied to the LED, light is emitted from the active layer 202 by electron-hole combination. For example, the active layer 202 may include a semiconductor material such as AlGaN or AlInGaN. In addition, a thickness of the active layer 202 may be in a range from about 10 nm to about 200 nm, but exemplary embodiments are not limited thereto.

The second semiconductor layer 203 is disposed on the active layer 202. The second semiconductor layer 203 may be a p-type semiconductor layer. For example, the second semiconductor layer 203 may be formed by doping a semiconductor material such as InAlGaN, GaN, AlGaN, InGaN, AlN, or InN with a dopant such as Mg. However, exemplary embodiments are not limited thereto, and the semiconductor material and the dopant of the second semiconductor layer 203 may be determined according to the desired emission color of the LED. In addition, a thickness of the second semiconductor layer 203 in the lengthwise direction may be in a range from about 50 nm to about 500 nm, but exemplary embodiments are not limited thereto.

The LED may further include a clad layer disposed between the first semiconductor layer 201 and the active layer 202 or between the active layer 202 and the second semiconductor layer 203. The clad layer may be formed by doping a semiconductor material such as AlGaN or InAlGaN with a conductive dopant. The LED may have a higher luminous efficiency by further including the clad layer.

In addition, the LED may further include a first electrode layer 211 disposed below the first semiconductor layer 201 and a second electrode layer 212 disposed above the second semiconductor layer 203, as illustrated in FIG. 3.

The first electrode layer 211 and the second electrode layer 212 may each include a conductive oxide or a metal material that is typically used as a common electrode. For example, each of the first and second electrode layers 211 and 212 may include or be otherwise formed of conductive oxide, such as indium tin oxide (ITO), indium zinc oxide (IZO), zinc oxide (ZnO), and/or indium tin zinc oxide (ITZO), or a metal material such as Ag, Mg, Al, Pt, Pd, Au, Ni, Nd, Ir, Cr, and/or Cu. A thickness of each of the first and second electrode layers 211 and 212 may be in a range from about 1 nm to about 100 nm, but exemplary embodiments are not limited thereto, as these elements may be otherwise composed and may include other materials.

The first and second electrode layers 211 and 212 may serve as an ohmic contact layer. For example, since the LED includes the first and second electrode layers 211 and 212, a separate ohmic contact layer need not be provided at a portion of the LED connected to the first and second electrodes 123 and 133 on the substrate 101.

In addition, the LED may further include an insulating layer 230 and a hydrophobic layer 240 which may each cover at least a portion of outer surfaces of the first semiconductor layer 201, the active layer 202, and the second semiconductor layer 203, as illustrated in FIG. 3. It is noted that in FIG. 3, the insulating layer 230 and the hydrophobic layer 240 are understood to wrap around the circumference of the LED, 360°, however, these layers are shown in a cut-away view so as to allow the covered elements to be seen. It should also be noted, however, that the insulating layer 230 and the hydrophobic layer 240 need not wrap around for the full 360°.

The insulating layer 230 is disposed so as to cover at least a part of the outer surfaces of the first and second semiconductor layers 201 and 203 and the entirety of the outer surface of the active layer 202. For example, the insulating layer 230 may be disposed at a remaining area except for an area where the LED is electrically connected to the first and second electrodes 123 and 133.

When the LED is misaligned on the first and second electrodes 123 and 133, the active layer 202 of the LED is short-circuited with the first electrode 123 or the second electrode 133, and a problem may occur whereby the LED might not emit light. In addition, the active layer 202 is not invariably located at a central portion of the LED in a longitudinal direction, and the active layer 202 may be located further toward the first semiconductor layer 201 or the second semiconductor layer 203. In such an exemplary embodiment, an electrical short circuit may easily occur between the active layer 202 and the first electrode 123 or between the active layer 202 and the second electrode 133. In such an exemplary embodiment, as the insulating layer 230 is disposed so as to cover the entirety of the outer surface of the active layer 202, an electrical short circuit that may occur between the active layer 202 and the first electrode 123 or between the active layer 202 and the second electrode 133 may be substantially prevented. In addition, since the insulating layer 230 protects the outer surfaces of the first and second semiconductor layers 201 and 203 the active layer 202, the durability of the LED may be increased and a decrease in luminous efficiency due to physical damages to the LED may be substantially prevented.

The insulating layer 230 may include or otherwise be formed of silicon nitride ($SiN_x$), silicon oxide ($SiO_x$), aluminum oxide ($Al_2O_3$), hafnium oxide ($HfO_2$), yttrium oxide ($Y_2O_3$), titanium dioxide ($TiO_2$), or the like. In addition, the insulating layer 230 may have a multilayer structure including at least two insulating layers having different compositions and/or other physical properties.

The hydrophobic layer 240 is disposed on the insulating layer 230. The hydrophobic layer 240 allows a surface of the LED to have hydrophobic characteristics, thereby substantially preventing aggregation between the plurality of LEDs. For example, when the plurality of LEDs are mixed with a solvent or are aligned by an applied voltage, the aggregation phenomenon between the plurality of LEDs is substantially minimized, such that degradation of the characteristics of the LED may be substantially prevented, and the plurality of LEDs may be more easily aligned on the substrate 101.

As for the hydrophobic layer 240, self-assembled monolayers (SAMs), such as octadecyltrichlorosilane (OTS), fluoroalkyltrichlorosilane, or perfluoroalkyltriethoxysilane, fluoropolymers, such as teflon or cytop, or the like may be used alone or in combination, but exemplary embodiments are not limited thereto.

There may be a difficulty in manually arranging nano-sized LEDs on the substrate 101 and electrically connecting each of the plurality of LEDs to the first and second electrodes 123 and 133. Accordingly, the plurality of LEDs may be self-aligned by applying a voltage to the first and second electrodes 123 and 133. For example, the plurality of LEDs may be contained in a solvent to be applied in a solution state on the first and second electrodes 123 and 133, and then the plurality of LEDs may be aligned on the first and second electrodes 123 and 133 with a certain directionality by the voltage applied to the first and second electrodes 123 and 133. In such an exemplary embodiment, the plurality of LEDs may be aligned substantially perpendicular to the first and second electrodes 123 and 133.

However, the plurality of LEDs might not be uniformly applied at desired positions as they may float freely within the solution. When a voltage is applied to the first and second electrodes 123 and 133 to self-align the LEDs in a state where the density of the plurality of LEDs is not uniform, the number of LEDs aligned in a unit area might not be uniform.

Accordingly, a luminance difference may occur depending on the position, and the display quality of the display device may be degraded.

In addition, each of the LEDs is formed through a process of laminating and etching a plurality of thin films. In such a case, the LED may be defectively shaped due to process problems or physical damages. The defectively shaped LED might not emit light after being aligned or may hinder normal LEDs from moving and being aligned. Accordingly, the luminous efficiency of the display device may be lowered.

Accordingly, exemplary embodiments of the present invention may check the density and shape of the plurality of LEDs before self-aligning the plurality of LEDs.

Hereinafter, a method of inspecting LEDs according to an exemplary embodiment of the present invention will be described with reference to FIGS. 4 to 8.

Figure 4:
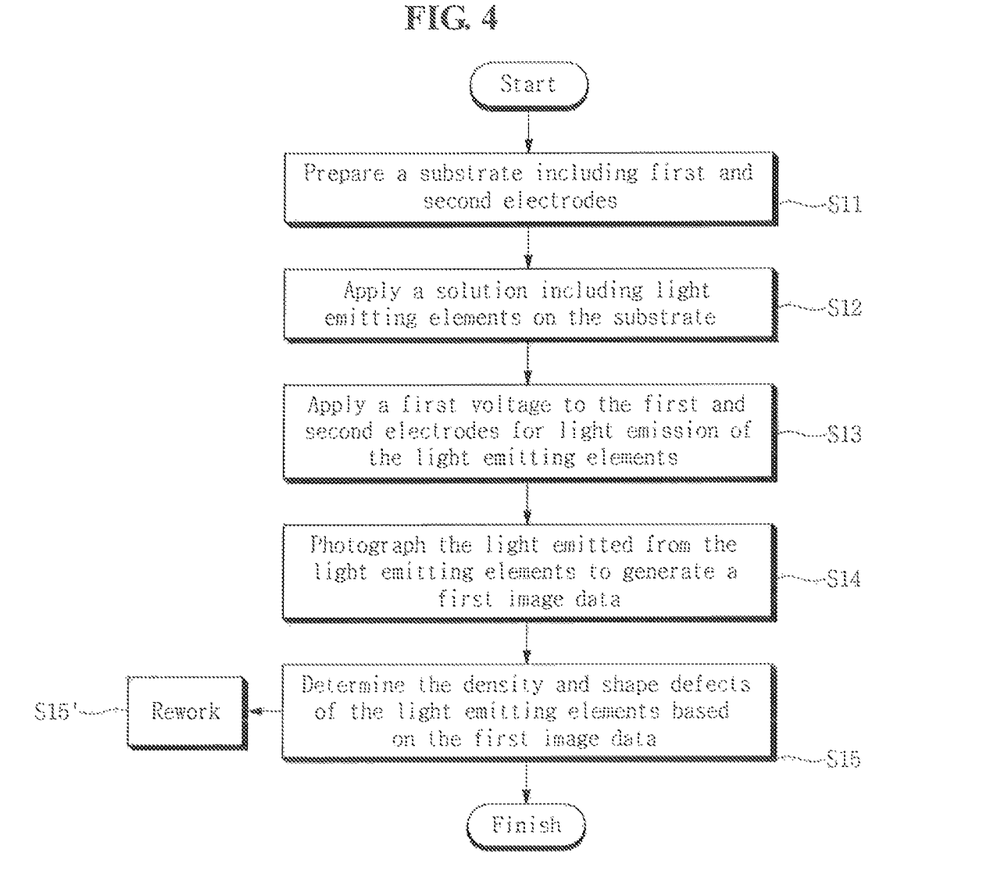
FIG. 4 is a flowchart showing a method of inspecting LEDs according to an exemplary embodiment of the present invention.
Figure 5A:
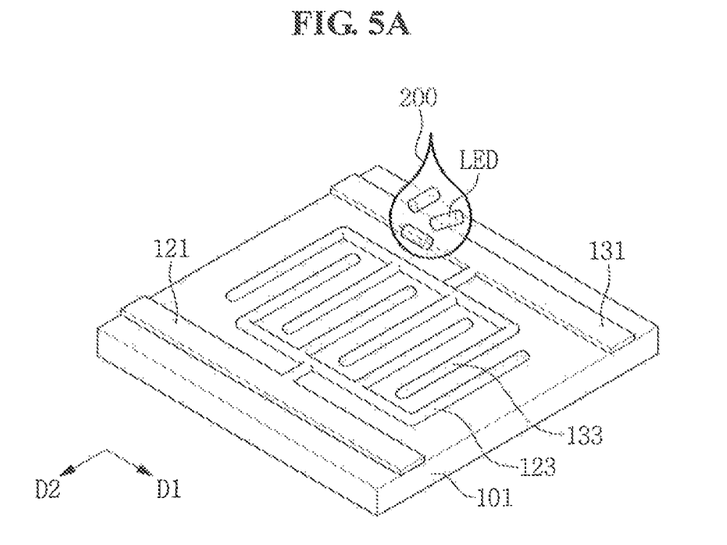
FIGS. 5A and 5B are perspective views illustrating a method of inspecting LEDs according to an exemplary embodiment of the present invention.
Figure 5B:
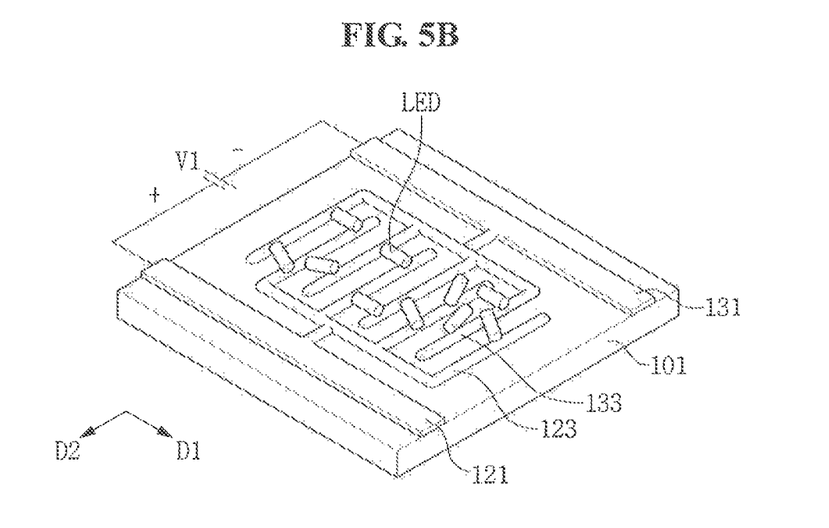
Figure 6:
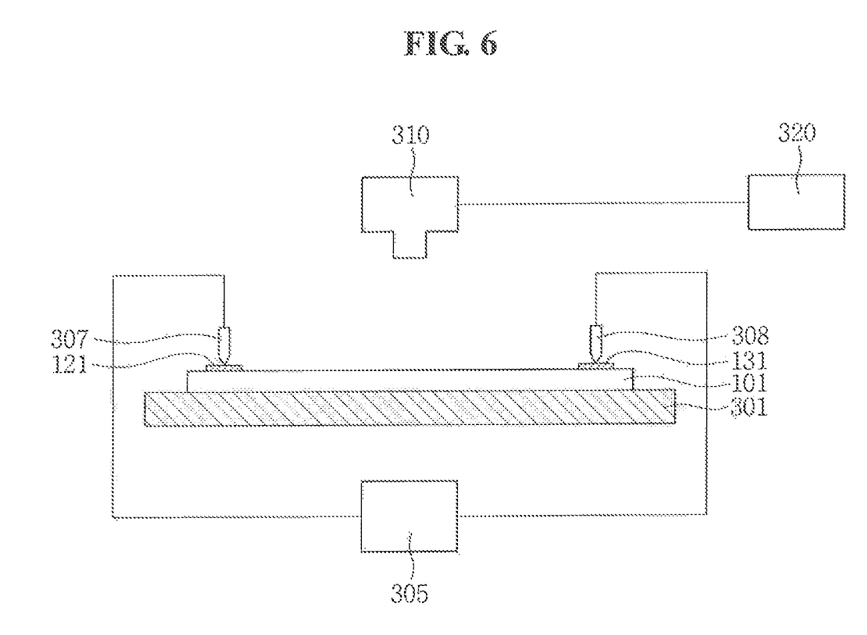
FIG. 6 is a cross-sectional view illustrating an apparatus for inspecting LEDs according to an exemplary embodiment of the present invention.

FIG. 4 is a flowchart, showing a method of inspecting LEDs according to an exemplary embodiment of the present invention. FIGS. 5A and 5B are perspective views illustrating a method of inspecting LEDs according to an exemplary embodiment of the present invention. FIG. 6 is a cross-sectional view illustrating an apparatus for inspecting LEDs according to an exemplary embodiment of the present invention.

First, as illustrated in FIGS. 4 and 5A, the substrate 101 on which the first and second electrodes 123 and 133 are disposed is prepared (S11). The first and second electrodes 123 and 133 extend from the first and second wirings 121 and 131, respectively. The first and second electrodes 123 and 133 extend primarily along the second direction D2 and may be alternately disposed with respect to each other along the first direction D1.

Next, a solution 200 including the plurality of LEDs is applied on the substrate 101 (S12). The solution 200 may include a solvent in an amount ranging from about 100 parts by weight (wt %) to about 12000 wt % with respect to 100 wt % of the LED. When the solvent exceeds about 12000 wt % with respect to 100 wt % of the LED, the number of LEDs per unit area is reduced, and accordingly, the luminous efficiency may be lowered. On the other hand, when the solvent is less than about 100 wt % with respect to 100 wt % of the LED, the movement and alignment of the LEDs may be restricted, the number of LEDs that are not aligned and removed increases, and the process costs may increase. However, exemplary embodiments of the present invention are not limited thereto, and the concentration (wt % of the LED) of the solution 200 including the LEDs may be suitably determined in consideration of the distance between the first and second electrodes 123 and 133 and the aspect ratio of the LED.

Any solvent that does not give physically or chemically damage the LED may be used as long as the solvent is suited to facilitate dispersing and movement of the LED, and may be easily vaporized (e.g. evaporated) so as to be readily removed. For example, the solvent may acetone, water, alcohol, and/or toluene.

Next, as illustrated in FIGS. 4 and 5B, a first voltage V1 is applied to the first and second electrodes 123 and 133 to cause the LED to emit light (S13). For example, the substrate 101 applied with the solution 200 including the LEDs is mounted on an apparatus for inspecting LEDs, and the first voltage V1 is applied to the first and second electrodes 123 and 133 for the LED to emit light.

As illustrated in FIG. 6, the inspection apparatus includes a stage 301, a power supplier 305, probes 307 and 308, a camera 310, and a display unit 320.

The stage 301 supports the substrate 101 to be inspected. The substrate 101 may be adsorbed on the stage 301 by a separate device or vacuum. In addition, the substrate 101 may be simply placed on an upper surface of the stage 301, or fastened on the stage 301 using a double-sided tape or a different fastening member.

The power supplier 305 applies the first voltage V1 to the first and second electrodes 123 and 133 on the substrate 101. The power supplier 305, according to an exemplary embodiment of the present invention, applies the first voltage V1 to the first and second wirings 121 and 131 which extend to an outer portion of the substrate 101, using the two probes 307 and 308. For example, the two probes 307 and 308 directly contact the first and second wirings 121 and 131, respectively, and the first and second electrodes 123 and 133 receive the voltage through the first and second wirings 121 and 131, respectively.

The first voltage V1 is a voltage for causing the LED to emit light, and the first voltage V1 may be a DC voltage or an AC voltage. For example, when the first voltage V1 is a DC voltage, the first voltage V1 may be in a range from about 0.1 V to about 10 V. In addition, when the first voltage V1 is an AC voltage, the first voltage V1 may be a voltage having an amplitude in a range from about 0.1 V to about 10 V and having a frequency in a range from about 10 Hz to about 100 GHz. The voltage value of the first voltage V1 is larger than a minimum value needed to cause the LED to emit light. Accordingly, the first voltage V1 may have a relatively small voltage value, as compared with that of a second voltage V2 which is applied to align the LEDs.

In addition, the first voltage V1 may be applied for a period of time in a range from about 5 seconds to about 30 seconds. This period of time may be a time sufficient for identifying the light emission of the LED. Accordingly, the first voltage V1 may be applied for a relatively short period of time as compared with a time for which the second voltage V2 is applied.

Next, as illustrated in FIGS. 4, 5, and 6, the camera 301 of the inspection apparatus is used to photograph the light emitted from the LED so as to generate first image data (S14). The camera 310 is disposed apart from the stage 301 with the substrate 101 being disposed therebetween. The camera 310 may move up and down or left and right to adjust a gap between the camera 310 and the substrate 101.

The display unit 320 displays the first image data input from the camera 310. Based on the first image data, the user may determine density and shape defects of the LED (S15). For example, the user may determine the density and shape defects of the LEDs that are applied on the substrate 101 in a state of the solution 200, before aligning the LEDs.

When the density of the LEDs is not uniform or a shape defect is identified, the user may perform a remedial rework process whereby the solution 200 including the plurality of LEDs is reapplied on the substrate 101 (S15'). Accordingly, degradation of the luminous efficiency of the display device may be substantially prevented and the display quality of the display device may be increased.

In addition, according to the method of inspecting LEDs according to an exemplary embodiment of the present invention, the density and shape defects of the plurality of LEDs may be determined before self-aligning the plurality of LEDs, thus enabling more detailed process control.

Figure 7:
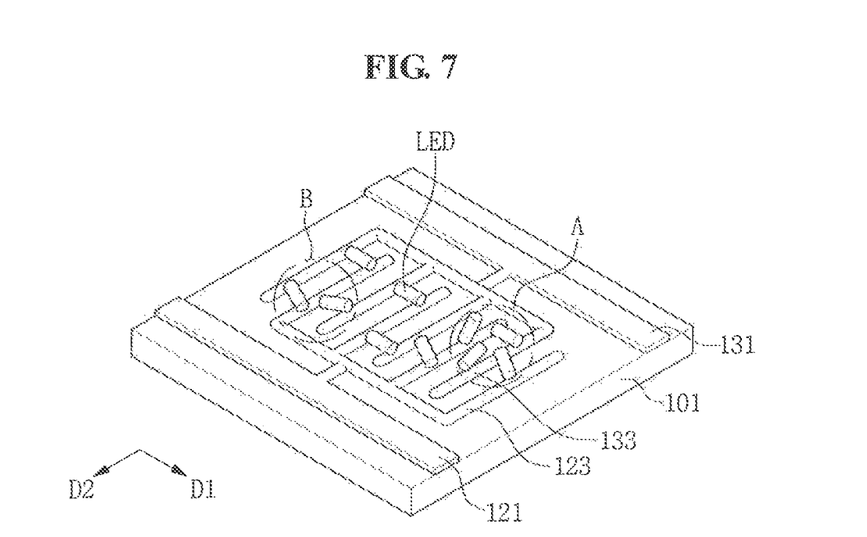
FIGS. 7 and 8 are perspective views illustrating a method of inspecting LEDs according to an exemplary embodiment of the present invention.
Figure 8:
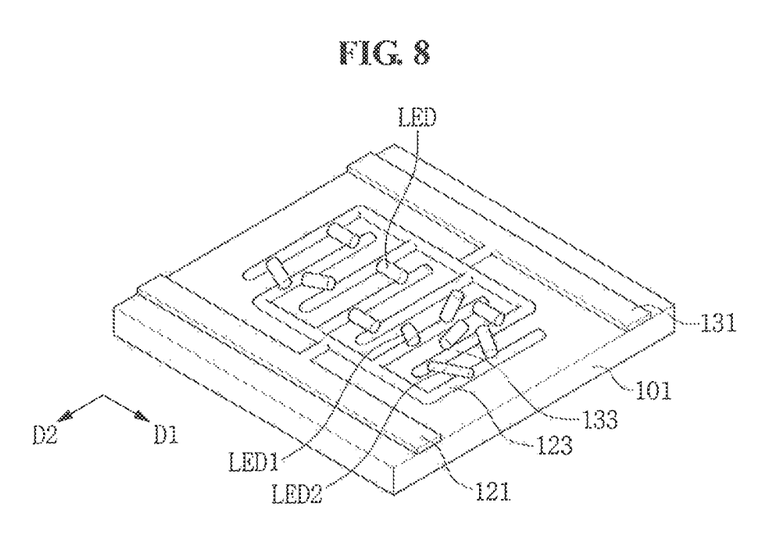

FIGS. 7 and 8 are perspective views illustrating a method of inspecting LEDs according to an exemplary embodiment of the present invention. In detail, FIG. 7 shows a case in which the density of the plurality of LEDs is not uniform, and FIG. 8 shows a case in which an LED with a defective shape is included.

As illustrated in FIG. 7, the plurality of LEDs might not be uniformly applied to desired positions as they float freely in a solution. For example, assuming that an area A and an area B are substantially equal, the density of the LEDs in the area A may be higher than the density of the LEDs in the area B.

When the LEDs are self-aligned by applying a voltage to the first and second electrodes 123 and 133 in a state where the density of the plurality of LEDs is not uniform, the number of LEDs aligned per unit area might also be non-uniform. In addition, when the density is excessively high, contact between the LEDs may frequently occur, and movement and alignment of the LEDs may be restricted. On the other hand, when the density is excessively low, the luminous efficiency of the display device may be lowered. For example, when the density of the LEDs is not uniform, the display quality of the display device may be degraded.

In addition, as illustrated in FIG. 8, some LEDs LED1 and LED2 among the plurality of LEDs may be defectively shaped. Each of the LEDs is formed through a process of laminating and etching a plurality of thin films. In such a case, some of the LED may be defectively shaped due to process problems or physical damage. For example, the LEDs LED1 and LED2 that have cracks or are formed with different lengths might not be normally connected to the first and second electrodes 123 and 133. In addition, the LEDs LED1 and LED2 having defective shapes might not emit light even after being aligned, and/or may hinder the normal LEDs from moving and being aligned. Accordingly, the luminous efficiency of the display device may be lowered. For example, the display quality of the display device may also be degraded when the LED is shape-defective.

In a method of inspecting LEDs, according to an exemplary embodiment of the present invention, the density and shape defects of the plurality of LEDs may be determined before self-aligning the plurality of LEDs, thus enabling more detailed process control. In addition, a rework process for reapplying the solution including the plurality of LEDs is performed according to the determination result of the density and shape defects, such that degradation of the luminous efficiency of the display device may be substantially prevented and the display quality of the display device may be increased.

Hereinafter, with reference to FIGS. 9 and 10, a method of inspecting LEDs according to an exemplary embodiment of the present invention will be described. It may be assumed that to the extent that a detailed description of certain elements is omitted, the omitted description may be at least similar to that of corresponding elements that have already been described.

Figure 9:
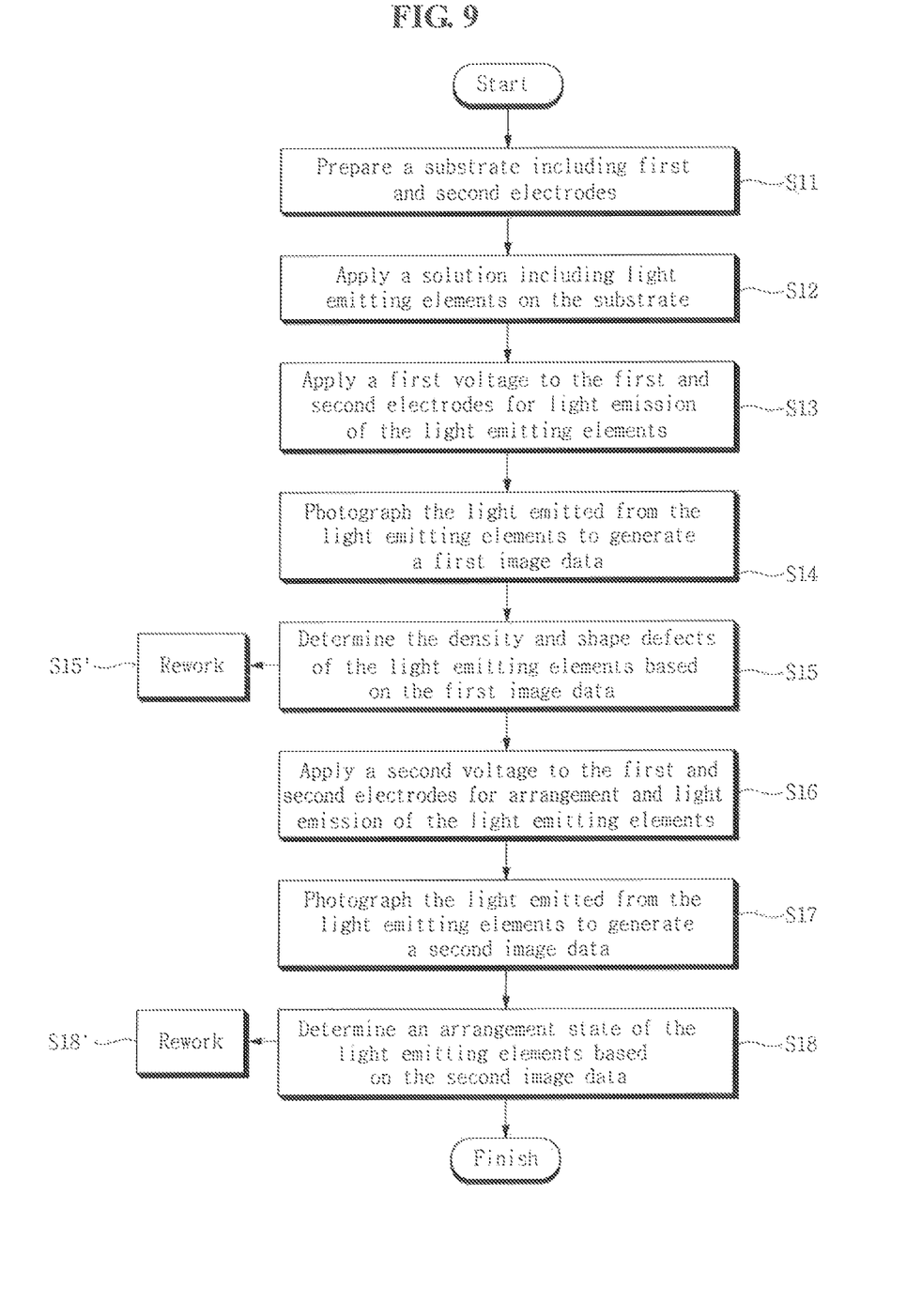
FIG. 9 is a flowchart showing a method of inspecting LEDs according to an exemplary embodiment of the present invention.
Figure 10:
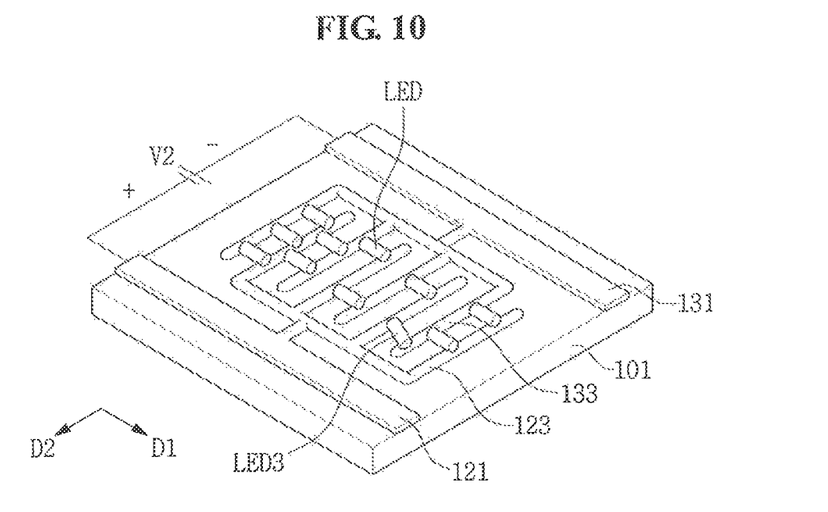
FIG. 10 is a perspective view illustrating a method of inspecting LEDs according to an exemplary embodiment of the present invention.

FIG. 9 is a flowchart showing a method of inspecting LEDs according to an exemplary embodiment of the present invention, and FIG. 10 is a perspective view illustrating a method of inspecting LEDs according to an exemplary embodiment of the present invention.

As illustrated in FIGS. 9 and 10, a method of inspecting LEDs, according to an exemplary embodiment of the present invention, is at least similar to that of steps S11 to S15. However, the method of inspecting LEDs according to an exemplary embodiment of the present invention may further include applying a second voltage V2 to the first and second electrodes 123 and 133 to align the LEDs and cause the LEDs to emit light, photographing the light emitted from the LEDs to generate second image data, and determining an alignment state of the LEDs using the second image data.

Subsequent to the step S15, the second voltage V2 is applied to the first and second electrodes 123 and 133 to align the LEDs and cause the LEDs to emit light (S16). Tor example, the LEDs may be aligned along a predetermined direction by the second voltage V2 and may emit light at the same time.

When the second voltage V2 is applied to the first and second electrodes 123 and 133, a polarization phenomenon occurs in the LED and the LED moves in the solvent due to electrostatic attraction between the LED and the first and second electrodes 123 and 133. Accordingly, the plurality of LEDs may be aligned to have a certain directionality with respect to the first and second electrodes 123 and 133.

The second voltage V2 is an AC voltage. For example, the second voltage V2 may be a voltage that has an amplitude in a range from about 10 V to about 1000 V and has a frequency in a range from about 10 Hz to about 100 GHz. The second voltage V2 is a voltage for aligning the LEDs at the same time as they emit light. The second voltage V2 may have a relatively large value as compared to that of the first voltage V1.

In addition, the second voltage V2 may be applied for a period of time ranging from about 60 seconds to about 120 seconds. The second voltage V2 should be applied for a time that is sufficient for aligning all of the plurality of LEDs. Accordingly, the second voltage V2 may be applied for a relatively long time, as compared with the first voltage V1, which is applied only long enough to cause light emission of the LED.

Next, the light emitted from the LED is photographed to generate second image data (S17), and the user may then determine an alignment state of the LEDs using the second image data (S18).

When it is determined that the alignment state of the LEDs is defective, the user may perform a rework process whereby the solution including the plurality of LEDs is reapplied on the substrate 101 or the LEDs are realigned (S18'). Accordingly, degradation of the luminous efficiency of the display device may be substantially prevented and the display quality of the display device may be increased.

For example, as illustrated in FIG. 10, some LEDs LED3 of the plurality of LEDs may be located obliquely on the substrate 101. The LED LED3 that is located obliquely on the first and second electrodes 123 and 133 may interfere with the alignment of adjacent LEDs, and may reduce the density of the LEDs, in addition, the LED LED3 that is located obliquely might not be connected normally to the first and second electrodes 123 and 133, or might not otherwise emit light. Accordingly, when the alignment state of the LEDs is defective, the display quality of the display device may be degraded.

In a method of inspecting LEDs according to an exemplary embodiment of the present invention, the plurality of LEDs may be self-aligned. At the same time as the alignment state of the plurality of LEDs is determined, thereby enabling more detailed process control. In addition, as a rework process for reapplying the solution including the plurality of LEDs or realigning the LEDs is performed according to the determination result of the misalignment defects, degradation of the luminous efficiency of the display device may be substantially prevented and the display quality of the display device may be increased.

As set forth hereinabove, according to exemplary embodiments of the present invention, a method of inspecting LEDs may more finely control the process by determining the density and shape defects of the LEDs before aligning the LEDs.

While the present invention has been illustrated and described with reference to the exemplary embodiments thereof, it will be apparent to those of ordinary skill in the art that various changes in form and detail may be made thereto without departing from the spirit and scope of the present invention.

What is claimed is:

1. A method of inspecting light emitting elements, the method comprising:
   disposing a first electrode and a second electrode on a substrate;
   applying a solution including a plurality of light emitting elements floating freely within a solvent on the first electrode and the second electrode;
   applying a first voltage across the first electrode and the second electrode so as to cause the plurality of light emitting elements to emit light;
   photographing the light emitted from the plurality of light emitting elements and generating first image data therefrom; and
   determining a density of the plurality of light emitting elements using the first image data.

2. The method of claim 1, wherein each of the plurality of light emitting elements comprises:
   a first semiconductor layer;
   an active layer disposed on the first semiconductor layer; and
   a second semiconductor layer disposed on the active layer.

3. The method of claim 1, wherein each of the plurality of light emitting elements has a cylindrical shape.

4. The method of claim 3, wherein each of the plurality of light emitting elements has a diameter in a range from about 100 nm to about 1 μm.

5. The method of claim 1, wherein the first voltage is a direct current (DC) voltage, and the first voltage is in a range from about 0.1 V to about 10 V.

6. The method of claim 1, wherein the first voltage is an alternating current (AC) voltage, and the first voltage has an amplitude in a range from about 0.1 V to about 10 V and has a frequency, in a range from about 10 Hz to about 100 GHz.

7. The method of claim 1, wherein the first voltage is applied across the first electrode and the second electrode for a period of time in a range from about 5 seconds to about 30 seconds.

8. The method of claim 1, wherein applying the solution including the plurality of light emitting elements comprises:
   applying the solution including the plurality of light emitting elements in an inkjet process method.

9. The method of claim 1, wherein determining the density of the plurality of light emitting elements comprises:
   performing a remedial rework process in which the solution including the plurality of light emitting elements is reapplied on the first electrode and the second electrode when the density of the plurality of light emitting elements is determined to be non-uniform.

10. The method of claim 1, further comprising: determining whether a shape of the plurality of light emitting elements is defective using the first image data.

11. The method of claim 10, wherein determining whether the shape of the plurality of light emitting elements is defective comprises:
    performing a remedial rework process in which the solution including the plurality of light emitting elements is reapplied on the first electrode and the second electrode when the plurality of light emitting elements is determined to have a defective shape.

12. A method of inspecting light emitting elements, the method comprising:
    disposing a first electrode and a second electrode on a substrate;
    applying a solution including a plurality of light emitting elements on the first electrode and the second electrode;
    applying a first voltage across the first electrode and the second electrode so as to cause the plurality of light emitting elements to emit light;
    photographing the light emitted from the plurality of light emitting elements and generating first image data therefrom;
    determining a density of the plurality of light emitting elements using the first image data;
    applying a second voltage across the first electrode and the second electrode so as to align the plurality of light emitting elements and cause the plurality of light emitting elements to emit light;
    photographing the light emitted from the plurality of light emitting elements to generate a second image data; and
    determining an alignment state of the plurality of light emitting elements using the second image data.

13. The method of claim 12, wherein the second voltage is an alternating current (AC) voltage.

14. The method of claim 13, wherein the second voltage has an amplitude in a range from about 10 V to about 1000 V and has a frequency in a range from about 10 Hz to about 100 GHz.

15. The method of claim 13, wherein the second voltage is applied across the first electrode and the second electrode for a period of time in a range from about 60 seconds to about 120 seconds.

16. An apparatus for inspecting light emitting elements, the apparatus comprising:
    a stage configured to support a substrate disposed thereon, the substrate including a first electrode and a second electrode and having a solution including light emitting elements applied thereon;
    a power supply applying a first voltage across the first and second electrodes;
    a camera disposed on the stage, the camera configured to photograph light emitted from the light emitting elements and to output first image data generated therefrom; and
    a display unit displaying the first image data output from the camera.

17. The apparatus of claim 16, wherein each of the light emitting elements comprises:
    a first semiconductor layer;
    an active layer disposed on the first semiconductor layer; and
    a second semiconductor layer disposed on the active layer.

18. The apparatus of claim 16, wherein the light emitting element has a cylindrical shape.

19. The apparatus of claim 16, wherein a diameter of the light emitting element is in a range from about 100 nm to about 1 µm.

20. The apparatus of claim 16, wherein the first voltage is in a range from about 0.1 V to about 10 V.

21. The apparatus of claim 16, wherein the solution includes the light emitting elements floating freely within a solvent.

* * * * *